Oct. 6, 1936.  H. E. SCHULZ  2,056,411
RAKE
Filed May 31, 1934
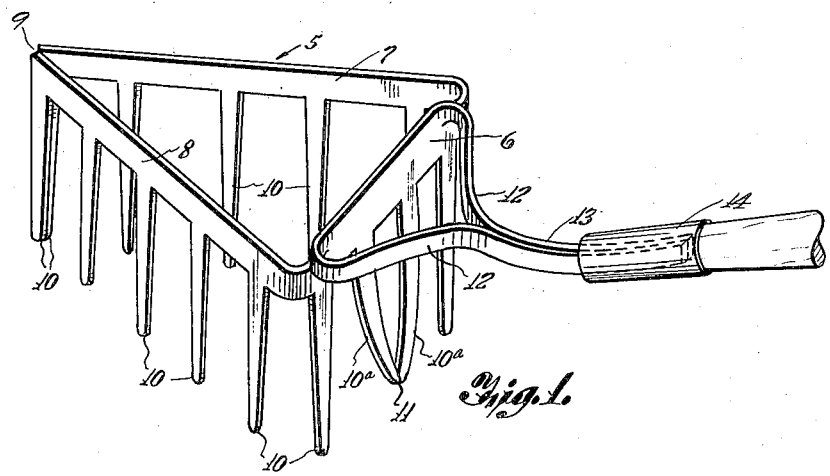
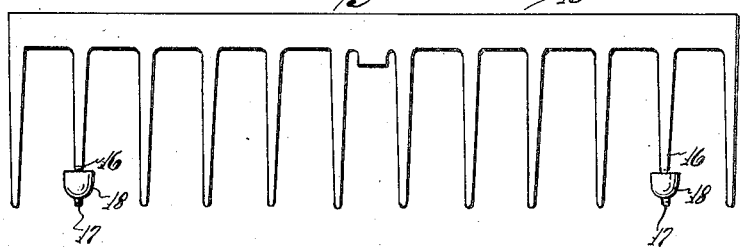
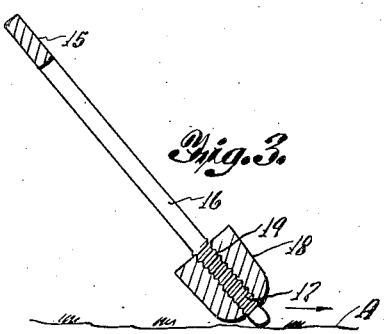
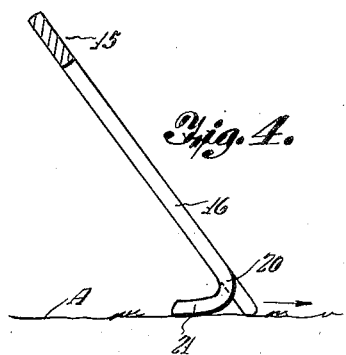
INVENTOR
HANS E. SCHULZ
By Adam E. Fisher
ATTORNEY Patented Oct. 6, 1936

2,056,411

UNITED STATES PATENT OFFICE 2,056,411

RAKE

Hans Eric Schulz, Milwaukee, Wis.

Application May 31, 1934, Serial No. 728,347

3 Claims. (Cl. 55—10)

My invention relates to improvements in lawn and garden rakes and the main object is to provide simple and efficient rake structures for use around the lawn and garden and particularly convenient in raking leaves and such matter from in and around shrubbery, hedges, etc.

Another object is to provide a rake formed in substantially triangular shape so as to present a point or apex suitable and handy for raking in and around shrubbery, corners and other places hard to get at with the usual straight rake.

Another object is to provide an improvement in rakes whereby the ordinary relatively sharp toothed garden rake may be adapted for and used as a lawn rake, means being provided to prevent the rake teeth from digging into and injuring the turf of the lawn.

With these and other objects in view the invention resides in the novel construction and arrangement of parts as hereinafter fully set forth and claimed, reference being had to the accompanying drawing wherein:

Figure 1 is a perspective view of a triangular form of rake for use around shrubbery, etc.

Figure 2 is a front elevation of a straight garden rake showing stop or guide means for adapting the rake for use on a lawn.

Figure 3 is an enlarged section through the rake showing a threaded stop or guide on one tooth and indicating the position of the rake relative to the ground when the rake is in use.

Figure 4 is a view similar to Figure 3 but showing one tooth of the rake bent back to act as a stop or guide.

Referring now with more particularity to the drawing and in Figure 1 thereof my rake comprises a head or head bar 5 bent into substantially the shape of an isosceles triangle and including what might be termed a base 6 and two similar converging legs 7 and 8 meeting at their free ends to form a point 9. The head thus formed has the usual integrally formed teeth 10 which may be sharp or blunt as desired and preferably the teeth on the base 6 are of even number with the two center teeth 10a drawn together at their lower ends as at 11, this to reduce the force necessary to draw the rake over the ground through grass or the like and to permit the teeth on the legs 7 and 8 to act and properly rake the ground. In forming or manufacturing the rake the head part of the blank is sheared or split longitudinally and medially toward its ends providing arms 12 which may then be bent and drawn together from the base 6 to provide a tang 13 to which the rake handle 14 may be readily attached as shown and in any conventional manner. So formed, the point 9 of the rake adapts it very conveniently and readily for raking and cleaning around shrubbery, plants or in corners or restricted places hard and often impossible to get at with the usual straight rake. It will be noted that teeth 10 are provided directly at the point 9 or ends of the legs 7 and 8 to facilitate this use.

The ordinary garden rake is usually not suitable for use on lawns or grass plots since the sharp teeth have a tendency to tear up and injure the turf and grass roots. To readily adapt such a rake 15 for use on the lawn I round and thread two or more teeth 16 adjacent their lower ends as shown at 17 and then provide rounded stops or guides 18 with a threaded bore 19 to screw on these teeth. The stops 18 are screwed up a short distance above the ends of the teeth and in use travel over the turf or ground A (Figure 3) and by their bulk prevent the teeth 16 from digging into the turf. Or, alternatively two or more of the teeth 16 may be bent back at their lower ends 20 and shortened somewhat so that the trailing arms or fingers 21 thus formed travel over the turf (Figure 4) and in same manner prevent the penetration of the remaining teeth. However, when the rake is held at a more perpendicular position relative to the ground the fingers 21 are elevated and clear the ground so that the teeth may penetrate and act in the desired manner as a garden rake, the same being true of the stops 18 which however, may be readily unscrewed and removed for use of the rake in the garden.

While I have herein set forth certain preferred embodiments of my invention it is understood that I may vary from the same in minor structural details, not departing from the spirit of the invention and within the scope of the appended claims.

I claim:

1. A rake head of the form of an open isosceles triangle, and including a base and two similar legs converging forwardly of the base, the head being lined all around at its under side with a plurality of spaced rake teeth, and a tang extended rearwardly from the base for the attachment of a handle.

2. A rake head of the form of an open isosceles triangle, the same including a base and two equal legs connected to and converging forwardly of the base, the head including base and legs being lined upon its under side with a plurality of spaced rake teeth, the teeth along the base being even in number and the two center teeth thereof being turned together at their lower ends for reducing the force necessary to draw the rake thru grass, and means for attaching a handle to the said base.

3. A rake head of the form of an open isosceles triangle comprising a base and two equal legs connected to and converging forwardly of the base, aligned rake teeth extended at the under sides of base and legs, the teeth along the base being even in number and equally spaced with the two center teeth turned together at their free extremities for reducing draft and to facilitate the action of the teeth of the legs, there being a composite tooth formed at the forward apex of the triangular head by the meeting of the teeth of the converged extremities of the legs, and arms converged rearwardly of the base for engaging a handle.

HANS ERIC SCHULZ.